United States Patent [19]
Bresin

[11] Patent Number: 4,952,103
[45] Date of Patent: Aug. 28, 1990

[54] OIL BURNER NOZZLE ADAPTOR RESURFACING TOOL AND METHOD

[76] Inventor: Elias H. Bresin, 1020 Northern Blvd., Baldwin, N.Y. 11510

[21] Appl. No.: 222,017

[22] Filed: Jul. 21, 1988

[51] Int. Cl.⁵ .............................................. B23B 45/06
[52] U.S. Cl. ..................................... 408/83.5; 82/113; 408/203.5; 409/178
[58] Field of Search .......................... 409/178; 30/92; 408/203.5, 208, 714, 83.5, 82, 80, 1 R, 703, 204, 205, 206; 144/205; 82/113

[56] References Cited
U.S. PATENT DOCUMENTS

| | | | |
|---|---|---|---|
| 1,841,938 | 1/1932 | Davis | 409/178 X |
| 1,904,941 | 4/1933 | Dunn | 409/178 X |
| 2,385,589 | 9/1945 | Shepler | 408/83.5 |
| 3,160,066 | 12/1964 | Phillips | 408/82 |
| 4,626,143 | 12/1986 | Rembold | 408/82 |
| 4,732,514 | 3/1988 | Shiina | 408/714 X |

Primary Examiner—Z. R. Bilinsky
Attorney, Agent, or Firm—Kirschstein, Ottinger, Israel & Schiffmiller

[57] ABSTRACT

A tool for and method of resurfacing an annular end of an oil burner nozzle adaptor on which an oil burner nozzle is detachably mounted in abutting sealing engagement during oil burner operation. The tool includes a cutter having a plurality of cutting teeth having cutting edges lying in a common plane perpendicular to an axis of rotation. The cutting teeth are concentrically positioned relative to the adaptor end and, during rotation, cut and resurface the same.

1 Claim, 2 Drawing Sheets

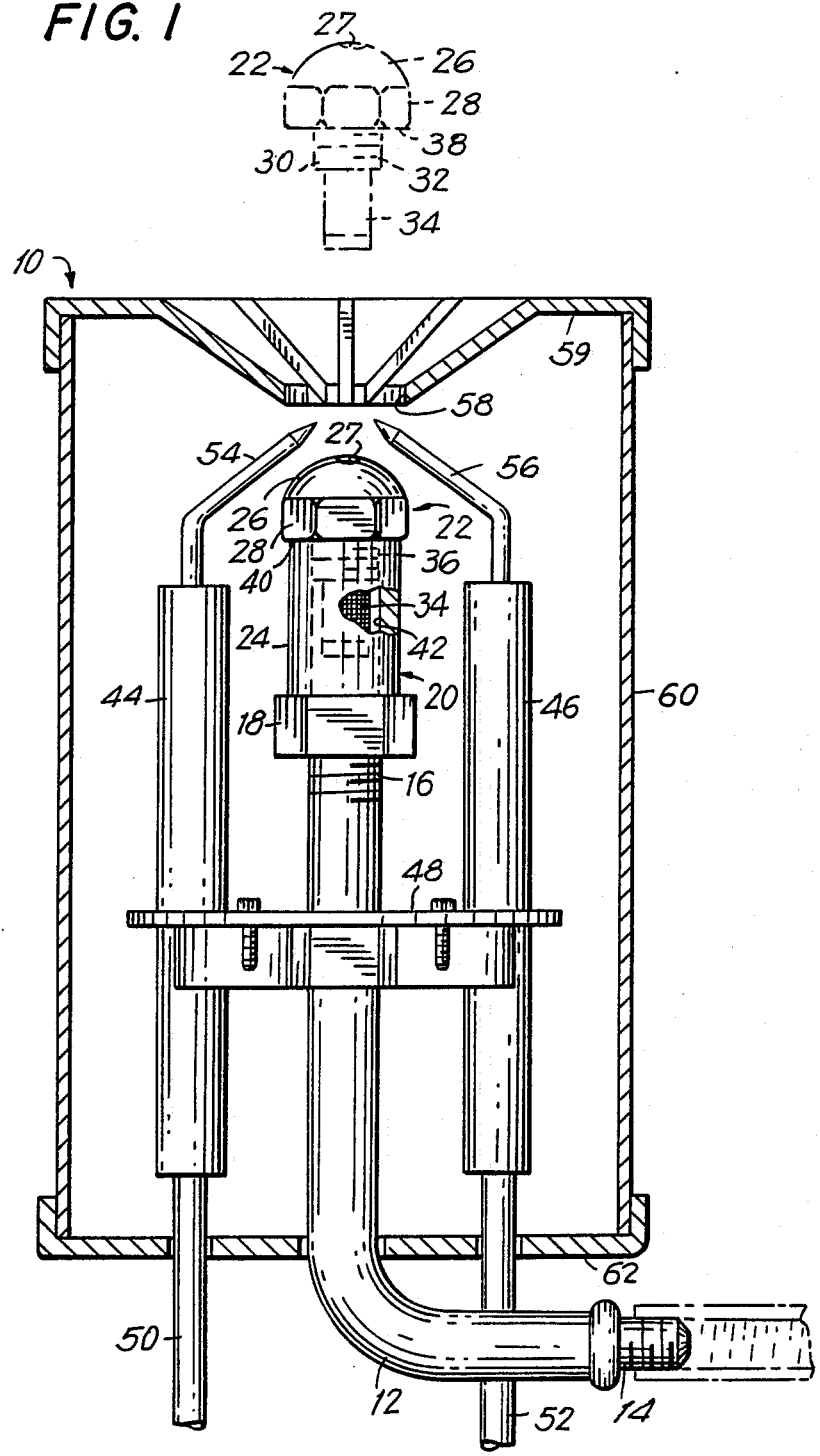

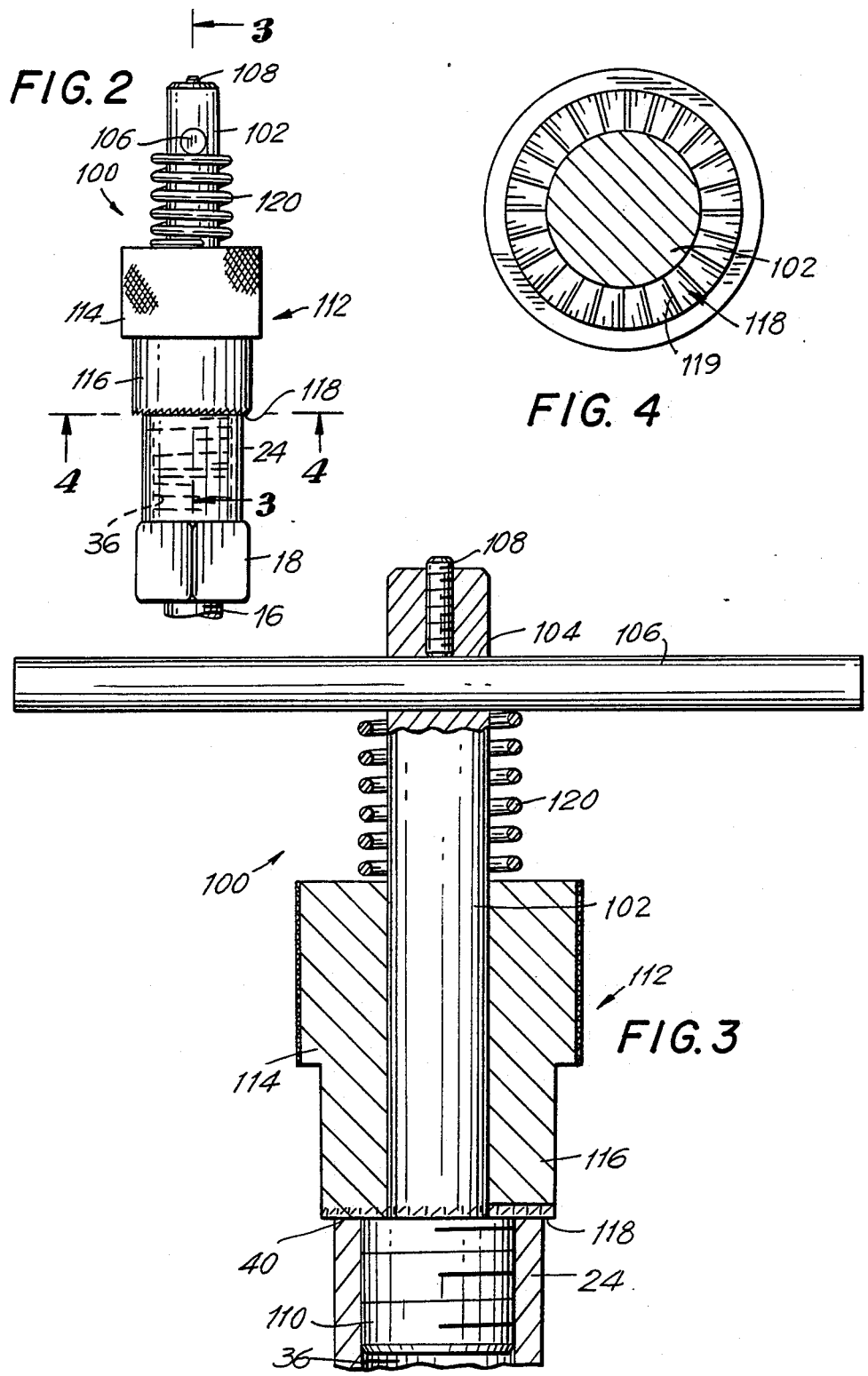

OIL BURNER NOZZLE ADAPTOR RESURFACING TOOL AND METHOD

BACKGROUND OF THE INVENTION

1. Field of the Invention

This invention relates to a tool for resurfacing an annular end of an oil burner nozzle adaptor on which an oil burner nozzle is detachably mounted in an abutting, sealing engagement during oil burner operation.

2. Description of Related Art

An oil burner typically includes an oil pump for pumping oil under pressure through an oil delivery tube located within a blast tube in which an igniter assembly is mounted. A nozzle adaptor is tightly threaded on a downstream end of the oil delivery tube. A nozzle having an exterior thread is threaded into an interior thread formed inside the adaptor. The nozzle atomizes the pressurized oil and forms a fan-like spray which is ignited by the igniter assembly to form a burner flame.

The adaptor has an annular end for abuttingly and sealingly engaging an annular surface provided on the nozzle. If the sealing contact between the adaptor end and the nozzle surface is compromised, then the pressurized oil passing through the interiors of the adaptor and the nozzle will leak out into the blast tube. This is highly undesirable, not only in terms of inefficiency of oil burner operation, but also because leaking oil in a blast tube causes a smoky overfired condition and, in an extreme case, can cause a blast tube fire.

Experience has shown that the aforementioned sealing contact is typically compromised by a negligent homeowner or service technician who, during maintenance of the oil burner, over-tightens the nozzle on the adaptor, thereby scoring and marring the annular end of the nozzle. In many installations, the nozzle is constituted of stainless steel, and the adaptor is constituted of brass, a material softer than stainless steel. In order to prevent the aforementioned oil leakage problem, the homeowner/technician often resorts to using a wrench to seat the nozzle on the adaptor in order to be certain that a tight seal is achieved therebetween. However, the use of a wrench often leads to over-tightening of the nozzle on its adaptor which, in turn, causes the harder nozzle to dig into and mar the softer adaptor. Once the adaptor is marred—a condition all too prevalent after repeated service calls—the very oil leakage problem which was intended to be avoided occurs.

After several service calls, many adaptors are damaged beyond repair. Good maintenance dictates that a new adaptor be installed to replace the damaged one. However, the practice of installing a new adaptor is not often followed, either because of lack of replacement parts or due to sloppy work habits. Also, some oil burners have double, multi-ganged or specially designed adaptors which are not typically carried in the truck of the service technician when making a house call. Hence, adaptors may sometimes not be replaced, even by technicians having good work habits and desiring to change a damaged adaptor.

SUMMARY OF THE INVENTION

1. Objects of the Invention

It is a general object of this invention to provide an innovative tool for the oil heating industry, the tool being operative to resurface the annular end of an oil burner nozzle adaptor.

It is another object of this invention to prevent oil leakage in blast tubes of oil burners.

A further object of this invention is to prevent a smoky overfired condition in a burner blast tube and to prevent blast tube fires.

Still another object of this invention is to provide a resurfacing tool which is easy to use in situ at the oil burner.

Yet another object of this invention is to reduce the inventory that a technician takes to a job site.

A still further object of this invention is to provide a novel method of servicing oil burners.

2. Features of the Invention

In keeping with these objects, and others which will become apparent hereinafter, one feature of this invention resides, briefly stated, in a tool for, and a method of, resurfacing an annular end of an oil burner nozzle adaptor on which an oil burner nozzle is detachably mounted in abutting, sealing engagement during oil burner operation. Preferably, the adaptor is of the type including a tubular mount extending along an axis and having an interior thread for threadedly engaging an exterior thread on the nozzle. The nozzle is advantageously of the type which includes a planar, annular surface which mates in surface-to-surface contact with said annular adaptor end. Pressurized oil is conveyed through the adaptor and the nozzle mounted thereon during oil burner operation.

In order to prevent leakage between the sealingly engaged annular nozzle surface and the annular adaptor end, the tool according to this invention comprises a cutter having a plurality of cutting teeth arranged in an annulus concentric with said axis. The cutting teeth have a plurality of cutting edges lying in a common plane perpendicular to said axis. Preferably, the cutter is constituted of case-hardened tool steel which is a harder material than that of which the adaptor is constituted.

The tool includes means for concentrically positioning the cutting teeth in cutting engagement with the annular end to be resurfaced after detachment of the nozzle from the adaptor during maintenance. Means are also provided for rotating the cutting edges about said axis in said common plane for cutting and resurfacing said annular adaptor end to form a generally planar, annular end against which the planar, annular nozzle surface abuttingly and sealingly engages during oil burner operation.

The positioning means advantageously includes an elongated shaft having an alignment bit provided with an exterior thread for threadedly engaging said interior thread formed in the adaptor.

In use of the tool, means are provided for jointly turning the cutter and the shaft for threading the bit into the tubular mount of the adaptor until the cutting teeth engage the annular adaptor end to be resurfaced.

Means are also provided for exerting a constant pressure along said axis against said cutter to axially urge the cutting edges into cutting engagement with said annular adaptor end. The rotation of the cutting edges about said axis in said common plane is advantageously performed by rotating a manually-rotatable collar integral with the cutter and mounted on said shaft for rotation relative thereto.

The resurfacing of the annular adaptor end insures that oil leakage is prevented because a surface-to-surface contact is restored between the annular adaptor end and the annular nozzle surface. Smoky overfired conditions or blast tube fires are reliably prevented. No longer need the service technician carry a huge inventory of replacement adaptors, since, frequently, the technician can resurface the adaptor in current use in the oil burner.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 1 is a cross-sectional view of a blast tube arrangement in an oil burner, showing in phantom lines the removal of an oil burner nozzle from a nozzle adaptor;

FIG. 2 is an elevational view of a re-surfacing tool in accordance with this invention, mounted on the nozzle adaptor of FIG. 1 for re-surfacing an annular end of the adaptor;

FIG. 3 is an enlarged sectional view taken on line 3—3 of FIG. 2 in the direction of the arrows; and FIG. 4 is an enlarged sectional view taken on line 4—4 of FIG. 2 in the direction of the arrows.

DETAILED DESCRIPTION OF THE PREFERRED EMBODIMENT

Referring now to FIG. 1, a conventional blast tube assembly 10 in an oil burner includes an oil delivery tube 12 having one exteriorly-threaded end 14 connected by piping to a supply of oil under pressure, and an opposite exteriorly-threaded end 16 on which a nozzle adaptor 20 is threadedly mounted. The adaptor 20 has at one end region thereof a hexagonal flange 18 engageable by a wrench or analogous tool for making and tightening the threaded interconnection between the adaptor 20 and the delivery tube 12.

An oil burner nozzle 22 is threadedly mounted on a tubular portion 24 of the adaptor which extends upwardly from the flange 18. Nozzle 22 has an enlarged generally hemispherical head 26 formed with a central aperture 27, a hexagonal peripheral wall 28 around the periphery of the head 26, a cylindrical shaft 30 having an exterior thread 32, and a cylindrical filter mesh extension 34 concentric with and extending downwardly from shaft 30. By engaging the hexagonal wall 28 with a wrench or analogous turning tool, the exterior thread 32 on the shaft 30 threadedly engages an interior thread 36 formed within the tubular portion 24 of the adaptor 20.

The underside of the head 26 has an annular planar surface or shoulder 38. When the nozzle 22 is fully tightened on the adaptor 20, the shoulder 38 sealingly abuts against an annular planar end 40 of the tubular portion 24.

During oil burner operation, oil is pumped under pressure through the delivery tube 12 into the interior 42 of the adaptor, whereupon the pressurized oil enters the openings of the filter extension 34 and is conveyed through the interior of the nozzle 22 before issuing from the aperture 27 and forming a generally fan-shaped spray or mist of atomized oil droplets. Since the oil pressure within the nozzle and the adaptor is on the order of 100 psi, the sealing engagement between the shoulder 38 and the adaptor end 40 must be unbroken or else oil leakage and the disadvantages noted above will ensue through such a compromised seal.

The assembly 10 further includes a pair of spark igniters 44, 46 mounted on a common support 48 at either side of the tube 12. First conductive ends 50, 52 are connected to a non-illustrated high-voltage (i.e. 10 kV) transformer; and opposite second conductive ends 54, 56 constitute electrodes which are bent inwardly to a location in the immediate circumambient region of the aperture 27. When the transformer fires a high-voltage pulse, a spark is formed between the electrodes 54, 56, thereby igniting the oil spray issuing from the nozzle and producing a burner flame. This flame extends through an opening 58 formed in a top cover 59 of a cylindrical burner head 60. The bottom of the head 60 has a bottom cover 62 having openings through which the conductive ends 50, 52 and the tube 12 pass.

As described above, the nozzle 22 is typically made of stainless steel, which is a harder material than brass which is typically used for the adaptor 20. Each time the nozzle is removed from and replaced on the adaptor, the possibility exists that the harder shoulder 38 will score the softer adaptor end 40, particularly if the nozzle is overtightened to prevent oil leakage between the shoulder 38 and adaptor end 40. However, such repeated scoring eventually compromises the integrity of the seal between the shoulder 38 and end 40 and, in time, leads to gaps large enough for the pressurized oil to escape.

Turning now to FIGS. 2-4, the present invention is directed to a tool 100 for, and a method of, re-surfacing the adaptor end 40 to form a generally planar surface for flush-mounting with the planar shoulder 38 to prevent oil leakage during oil burner operation. Tool 100 includes an elongated central shaft 102 extending along an axis. Shaft 102 has at one end thereof a transverse hole 104 through which a rod 106 extends perpendicular to the axis to form a tee-handle. A set screw 108 extends through a longitudinal bore at said one end of the shaft 102 to tightly secure the handle 106 to the shaft 102 for joint turning movement about the axis.

Shaft 102 has at its opposite end an exteriorly-threaded alignment bit or chaser 110 integral with the shaft. The chaser 110 has the same diameter (e.g. 9/16") as the shaft 30 of the nozzle, and the same screw pitch (e.g. 24 threads per inch) as the exterior thread 32. After removal of the nozzle from the adaptor, as shown in phantom lines in FIG. 1, the chaser 110 is inserted into the tubular portion 24 of the adaptor, and is threaded into the interior thread 36 formed therein. During such threading, the chaser not only restores any crossed threads and cleans out any dirt, metal filings or chips in the threads, but also concentrically positions the tool 100 on the same axis as that along which the tubular portion 24 extends.

The tool further includes a rotary cutter 112 mounted on the shaft 102 for rotation about the axis. Cutter 112 has a larger diameter cylindrical collar 114 whose outer periphery is knurled or otherwise roughened to facilitate manual gripping, and a smaller diameter portion 116 whose lower end has a plurality of cutting teeth 118. As best shown in FIG. 4, the teeth 118 are arranged in an annulus concentric with the axis. The teeth 118 outwardly terminate in sharp cutting edges 119 which are situated in a plane perpendicular to the axis. In a preferred embodiment, twenty-four teeth are provided, each constituted of case-hardened tool steel to avoid constant re-sharpening.

The tool further comprises a coil spring 120 having one end bearing against the handle 106, and an opposite end bearing against an upper end of the cutter 112. Spring 120 is mounted under tension on the tool, and constantly urges the cutter away from the handle in the axial direction.

In use, once the nozzle is removed from the adaptor whose end is to be re-surfaced, the chaser 110 is inserted into the tubular portion 24. A user turns the handle 106 and the shaft 102 together about the axis in one circumferential direction. Spring 120, which is mounted under a slight compression, tranfers this turning movement to the cutter 112 which likewise participates in such turning movement. When the cutting edges 119 abuttingly contact the annular adaptor end 40, the handle 106 is given one-half to one more extra turn to compress the spring 120 to a greater extent. During this extra turning, the cutter 112 does not rotate because it is held in place due to its biting engagement with the adaptor end 40. The additionally-compressed spring exerts an increased, constant, axial pressure on the cutter.

Next, the user turns the knurled collar 114, thereby turning the cutting edges 119 about the axis relative to the shaft 102. The cutting edges 119 are rotated in a plane perpendicular to the axis and, during such rotation, the cutting edges cut and resurface the exposed adaptor end 40 to form a planar surface thereat. Upon return of the nozzle, the planar shoulder 38 will make a surface-to-surface sealing contact with the re-surfaced planar adaptor end 40. Good sealing contact between the adaptor and the nozzle is thus restored.

To remove the tool, the above procedure is reversed. Any metal filings, chips or dirt formed during the resurfacing procedure should be cleaned out of the adaptor with solvent before re-mounting the nozzle.

The present invention is not intended to be limited to re-surfacing ends of single nozzle adaptors as illustrated, but is equally well applicable to double, multi-gang or specialty adaptors.

It will be understood that each of the elements described above, or two or more together, also may find a useful application in other types of constructions differing from the types described above.

While the invention has been illustrated and described as embodied in an oil burner nozzle adaptor resurfacing tool and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A cutting tool for cutting and resurfacing an annular end of an oil burner nozzle adaptor of the type including a tubular mount extending along an axis and having an interior thread for threadedly engaging an exterior thread on an oil burner nozzle of the type including a planar, annular surface abuttingly and sealingly engaging said annular end of the adaptor during oil burner operation in which pressurized oil is conveyed through the tubular mount and the nozzle mounted thereon, said tool comprising:

(a) an elongated shaft having an alignment bit at one end region thereof, said alignment bit having a leading end insertable into the tubular mount after removal of the nozzle therefrom, said alignment bit extending from the leading end along said axis to a trailing end and having an exterior thread for threadedly engaging the interior thread of the tubular mount;

(b) a cutter mounted on the shaft for rotation about said axis and having a plurality of cutting teeth arranged in an annulus concentric with said axis, said cutting teeth having case-hardened, tool steel, cutting edges lying in a common plane perpendicular to said axis and situated at the trailing end of the alignment bit;

(c) means for jointly turning the cutter and the shaft for threading the bit into the tubular mount until the cutting teeth at the trailing end of the alignment bit directly engage said annular end of the adaptor to be cut and resurfaced, said joint turning means including a handle fixedly mounted on the shaft at an end region opposite to said one end region thereof, said handle being a rod extending transversely to the shaft and having a bearing surface, said joint turning means including a fastener engaging the bearing surface and anchoring the rod in place;

(d) means for exerting a constant pressure along said axis against said cutter to axially urge the cutting edges into direct cutting engagement with said annular end of the adaptor, said exerting means including an elongated coil spring surrounding an intermediate region of the shaft with clearance, one end of the spring bearing against the cutter and an opposite end of the spring bearing against the handle; and (e) means for rotating the cutting edges about said axis and relative to said annular end of the adaptor in said common plane, for cutting and resurfacing said annular end to form a generally planar annular end against which said planar annular surface of the nozzle abuttingly and sealingly engages without oil leakage upon return of the nozzle during oil burner operation, said rotating means including a collar having an outer surface to facilitate manual gripping.

* * * * *